(12) United States Patent
Sawada et al.

(10) Patent No.: US 8,351,440 B2
(45) Date of Patent: Jan. 8, 2013

(54) RELAY DEVICE, COMMUNICATION SYSTEM, COMMUNICATION METHOD, AND COMPUTER PROGRAM

(75) Inventors: Seigo Sawada, Osaka (JP); Takumi Iwai, Osaka (JP); Yoshinari Oshio, Osaka (JP); Takao Nakamura, Osaka (JP); Tsuneyuki Takai, Osaka (JP)

(73) Assignee: Fujitsu Limited, Kawasaki (JP)

( * ) Notice: Subject to any disclaimer, the term of this patent is extended or adjusted under 35 U.S.C. 154(b) by 50 days.

(21) Appl. No.: 12/234,457

(22) Filed: Sep. 19, 2008

(65) Prior Publication Data

US 2009/0080447 A1   Mar. 26, 2009

Related U.S. Application Data

(63) Continuation of application No. PCT/JP2006/305500, filed on Mar. 20, 2006.

(51) Int. Cl.
*G06F 15/16* (2006.01)
(52) U.S. Cl. .......................... 370/401; 370/389
(58) Field of Classification Search .................. 370/389, 370/401
See application file for complete search history.

(56) References Cited

U.S. PATENT DOCUMENTS 6,981,054 B1* 12/2005 Krishna ................... 709/235
7,047,273 B2* 5/2006 Kamentsky et al. ........ 718/101
7,225,362 B2* 5/2007 Deily et al. ................ 714/38
2002/0112076 A1* 8/2002 Rueda et al. .............. 709/245
2004/0034855 A1 2/2004 Deily et al.

FOREIGN PATENT DOCUMENTS

| JP | 3134823 | 12/2000 |
|---|---|---|
| JP | 2001-36561 | 2/2001 |
| JP | 2004-88392 | 3/2004 |
| JP | 2005-260415 | 9/2005 |
| JP | 2005-260710 | 9/2005 |
| JP | 2007-150936 | 6/2007 |

OTHER PUBLICATIONS

Japanese Office Action dated Aug. 17, 2010 issued in corresponding Japanese Patent Application No. 2008-506099.
International Search Report for Application No. PCT/JP2006/305500; mailed Jun. 27, 2006.

* cited by examiner

*Primary Examiner* — Robert W Wilson
*Assistant Examiner* — Brian O Connor
(74) *Attorney, Agent, or Firm* — Staas & Halsey LLP

(57) ABSTRACT

An IP address and a MAC address of each of communication devices connected to a plurality of communication ports provided in a switching hub device are associated in an ARP table. Also, priority information representing the communication priority of each communication device is received, and the received priority information is associated with the MAC address of the communication device. When no IP address of a transmission source included in a data packet received at each communication port exists in the ARP table, the IP address and the MAC address of the transmission source are added to the ARP table and priority information is attached to the ARP table.

13 Claims, 16 Drawing Sheets

FIG. 3

ARP TABLE:11a

| IP ADDRESS | MAC ADDRESS | COMMUNICATION PORT | PRIORITY INFORMATION |
|---|---|---|---|
| 1. 2. 3. 1 | 1:2:3:4:5:1 | 21 | 1 |
| 1. 2. 3. 2 | 1:2:3:4:5:2 | 22 | 0 |
| 1. 2. 3. 3 | 1:2:3:4:5:3 | 23 | 0 |
| | | | |

FIG. 4

PRIORITY MAC ADDRESS INFORMATION:11b

| PRIORITY MAC ADDRESS |
|---|
| 1:2:3:4:5:1 |
| 1:2:3:4:5:4 |
| 1:2:3:4:5:8 |

| IP ADDRESS | MAC ADDRESS | COMMUNICATION PORT | PRIORITY INFORMATION |
|---|---|---|---|
| 1. 2. 3. 1 | 1:2:3:4:5:1 | 21 | 1 |
| 1. 2. 3. 2 | 1:2:3:4:5:2 | 22 | 0 |
| 1. 2. 3. 3 | 1:2:3:4:5:3 | 23 | 0 |
|  |  |  |  |

REWRITING (UPDATING)

| IP ADDRESS | MAC ADDRESS | COMMUNICATION PORT | PRIORITY INFORMATION |
|---|---|---|---|
| 1. 2. 3. 1 | 1:2:3:4:5:1 | 21 | 1 |
| 1. 2. 3. 2 | 1:2:3:4:5:8 | 28 | 1 |
| 1. 2. 3. 3 | 1:2:3:4:5:3 | 23 | 0 |
|  |  |  |  |

(a)

| IP ADDRESS | MAC ADDRESS | COMMUNICATION PORT | PRIORITY INFORMATION |
|---|---|---|---|
| 2.3.4.1 | 2:3:4:5:6:1 | 21 | 0 |
| 2.3.4.2 | 2:3:4:5:6:2 | 22 | 0 |
| 2.3.4.1 | 2:3:4:5:6:3 | 23 | 0 |

COMMUNICATION DEVICE 6c
COMMUNICATION DEVICE 6b
COMMUNICATION DEVICE 6a (b)

FIG. 12

HISTORY INFORMATION:11c

| RECEIVING DATE | IP ADDRESS | MAC ADDRESS |
|---|---|---|
| 2006-03-01-12:15:00 | 1. 2. 3. 2 | 1:2:3:4:5:2 |
| 2006-03-01-12:23:00 | 1. 2. 3. 6 | 1:2:3:4:5:6 |
| 2006-03-01-12:30:00 | 1. 2. 3. 7 | 1:2:3:4:5:7 |

| IP ADDRESS | MAC ADDRESS | COMMUNICATION PORT | PRIORITY INFORMATION |
|---|---|---|---|
| 1. 2. 3. 1 | 1:2:3:4:5:1 | 21 | 1 |
| 1. 2. 3. 2 | 1:2:3:4:5:2 | 22 | 0 |
| 1. 2. 3. 3 | 1:2:3:4:5:3 | 23 | 0 |
| 1. 2. 3. 4 | 1:2:3:4:5:4 | 24 | 1 |
| 1. 2. 3. 5 | 1:2:3:4:5:5 | 25 | 0 |

RESET

| IP ADDRESS | MAC ADDRESS | COMMUNICATION PORT | PRIORITY INFORMATION |
|---|---|---|---|
| 1. 2. 3. 1 | 1:2:3:4:5:1 | 21 | 1 |
| 1. 2. 3. 4 | 1:2:3:4:5:4 | 24 | 1 |

RELAY DEVICE, COMMUNICATION SYSTEM, COMMUNICATION METHOD, AND COMPUTER PROGRAM

CROSS REFERENCE TO RELATED APPLICATIONS

This application is a continuation of PCT International Application No. PCT/JP2006/305500 which has an International filing date of Mar. 20, 2006 and designated the United States of America.

BACKGROUND

1. Technical Field

The present invention relates to a relay device, a communication system, a communication method, and a computer program with which even when Internet Protocol (IP) addresses of communication devices such as server devices and IP telephone sets are duplicated in a Transmission Control Protocol/Internet Protocol (TCP/IP) network, a communication device having a high communication priority is connected to the network in preference to others, thereby enabling prevention of non-arrival of data packets to the communication devices.

2. Description of Related Art

In recent years, as a TCP/IP network becomes increasingly pervasive, efforts to reduce communication costs are made by directly connecting an IP telephone set having IP functions to a network. In communication environment using TCP/IP, an IP address (a series of numbers of four bytes) for identifying on a network communication device such as a workstation, a server device or an IP telephone set connected to the network needs to be assigned to each communication device (refer to, e.g., Patent Document 1).

FIG. 15 is a block diagram showing the configuration of a switching hub device as a conventional relay device. A switching hub device 100 as a conventional relay device includes a switching controller 110, a storage section 120 for storing an Address Resolution Protocol (ARP) table 120a, an ARP table controller 130 and communication ports 140-1, 140-2, ..., 140-N. The switching controller 110 performs transmission and reception of a data packet; when receiving a data packet, the switching controller 110 refers to the ARP table 120a, selects a communication port to which a communication device as a receiving end of the data packet is connected, and transfers the data packet to the selected communication port. Note that the ARP table 120a is a table for associating an IP address with a MAC address. The IP address is identification information for identifying a communication device on a network, and the MAC address is identification information for physically identifying a communication device.

The ARP table controller 130 determines whether or not the transmission source IP address and the transmission source MAC address of a received data packet are registered in the ARP table 120a, and additions and changes of the IP address and the MAC address are made to the ARP table 120a as needed. The communication ports 140-1, 140-2, ..., 140-N are sections for connection with communication devices to and from which data packets are transmitted and received.

A conventional switching hub device analyzes a data packet transmitted from each of communication devices 150-1, 150-2, ..., 150-N that are connected to communication ports to specify the receiving end of the data packet, and transmits the data packet to the specified communication device, thus completing transmission and reception of the data packet between communication devices.

[Patent Document 1] Japanese Laid-Open Patent Publication No. 2001-036561

SUMMARY

In a case where network administrators and users freely set IP addresses, there is a possibility of setting the same IP address to be duplicated to a plurality of communication devices. When IP addresses of a plurality of communication devices are duplicated, broadcasting frequently occurs to create unstable communication.

That is, in a case where there are communication devices with duplicated IP addresses on a local area network (LAN), the ARP table of each communication device is unreasonably updated. As a result, transmission and reception of data packets are not normally performed, causing a communication failure. For example, there is a possibility that a telephone does not ring in a case where the communication device is an IP telephone set. As a matter of course, there is a problem that a data packet is not transmitted and received to and from a communication device to which the data packet is originally to be transmitted, but instead, it is erroneously transmitted to and from another communication device with a duplicated IP address.

For example, consideration is given to a case where, as shown in FIG. 16, a server device 160 and terminals (PC) 170a and 170b are connected to a second LAN, a PC 170c is connected to a first LAN, and a data packet is transmitted from the PC 170c to the server device 160.

In a case where IP addresses of the server device 160 and the PC 170a are duplicated, a data packet transmitted from the PC 170c arrives at the second LAN to which the server device 160 is connected, based on the IP address. The switching hub device 100 acquires the IP address from the data packet, and transmits the data packet to a communication device with a MAC address associated with the acquired IP address by referring to the ARP table 120a. At this point, since the server device 160 and the PC 170a have a duplicated address, there are two MAC addresses corresponding to the IP address. Therefore, there is a possibility of erroneously transmitting the data packet to the PC 170a having the duplicated IP address.

When the data packet is transmitted to the PC 170a, the transmitted data packet is neglected. Since the data packet is not transmitted to the server device 160, a data packet is retransmitted (only for a TCP data packet). As a result, the time until the completion of transmission of a data packet from the PC 170c to the server device 160 increases by the time required for retransmitting. Note that in a case of a small data packet size and in a case of a UDP data packet, a data packet is not retransmitted. Therefore, cases where normal communication is made and cases where normal communication is not made arise. These cases are recognized as if the network enters an unstable state.

A relay device according to a first aspect includes a plurality of communication ports and is used for connecting to a network a communication device connected to each communication port. This relay device includes an identification information table in which network identification information identifying each communication device on the network is associated with physical identification information physically identifying the communication device, means for receiving priority information representing a communication priority of each communication device, means for associating the received priority information with the physical identification information of the communication device, first determining means for determining whether or not network identification information of a transmission source and physical identification information of the transmission source included in a data packet received at each communication port exist in the identification information table, adding means for adding the network identification information of the transmission source and the physical identification information of the transmission source to the identification information table when the first determining means determines that no network identification information of the transmission source exists in the identification information table, and means for attaching priority information corresponding to the physical identification information of the transmission source to the identification information table.

The relay device according to a second aspect further includes second determining means for determining whether or not the priority information corresponding to the physical identification information of the transmission source is higher than priority information corresponding to physical identification information associated with the network identification information of the transmission source in the identification information table, when the first determining means determines that the network identification information of the transmission source exists in the identification information table and no physical identification information of the transmission source exists in the identification information table; and updating means for updating the identification information table so as to associate the physical identification information of the transmission source with the network identification information when the second determining means determines that the priority information corresponding to the physical identification information of the transmission source is higher than the priority information corresponding to the physical identification information associated with the network identification information of the transmission source in the identification information table.

The relay device according to a third aspect further includes discarding means for discarding the data packet when the second determining means determines that the priority information corresponding to the physical identification information of the transmission source is lower than the priority information corresponding to the physical identification information associated with the network identification information of the transmission source in the identification information table.

The relay device according to a fourth aspect further includes means for recording, in history information, the network identification information and the physical identification information of the transmission source of the data packet discarded by the discarding means, and third determining means for determining whether or not physical identification information included in a transmitted data packet exists in the history information and further whether or not network identification information included in the data packet exists in the history information. In this relay device, when the third determining means determines that the network identification information included in the data packet exists in the history information, the adding means does not add the network identification information and the physical identification information included in the data packet to the identification information table.

In the relay device according to a fifth aspect, when the third determining means determines that no network identification information included in the data packet exists in the history information, the adding means adds the network identification information and the physical identification information included in the data packet to the identification information table.

The relay device according to a sixth aspect further includes resetting means for resetting the identification information table except for physical identification information with priority information being high and network identification information associated with the priority information in the identification information table.

The relay device according to a seventh aspect further includes translating means for translating, with reference to the identification information table, network identification information of a receiving end included in the data packet received at each communication port into physical identification information, and means for transferring the data packet to a communication device having the physical identification information translated by the translating means.

A communication system according to an eighth aspect includes the relay device of any one of the above-described aspects and communication devices connected respectively to the communication ports of the relay device, wherein communication is made between the respective communication devices.

A communication method according to a ninth aspect is a communication method of, with a relay device for connecting to a network a communication device connected to each of a plurality of communication ports, performing transmission with a receiving end of a received data packet specified by referring to an identification information table in which network identification information identifying each communication device on the network is associated with physical identification information physically identifying the communication device, the communication method includes the steps of associating priority information representing a communication priority of each communication device with physical identification information of the communication device; adding, when no network identification information of a transmission source included in a data packet received at each communication port exists in the identification information table, the network identification information of the transmission source and physical identification information of the transmission source to the identification information table and attaching priority information corresponding to the physical identification information of the transmission source to the identification information table; and updating the identification information table so as to associate the physical identification information of the transmission source with the network identification information when the network identification information of the transmission source exists in the identification information table, no physical identification information of the transmission source exists in the identification information table, and further the priority information corresponding to the physical identification information of the transmission source is higher than priority information corresponding to physical identification information associated with the network identification information of the transmission source in the identification information table, so as to prevent the same network identification information from being registered to be duplicated in the identification information table and specify a receiving end of the received data packet such that the receiving end is limited to one.

A computer program according to a tenth aspect is a computer program for causing an identification information table in which network identification information is associated with physical identification information to be updated based on network identification information and physical identification information of a communication device as a transmission source included in a data packet, the computer program includes a step of causing a computer to associate priority information representing a communication priority of each communication device with physical identification information of the communication device; a determination step of causing the computer to determine whether or not network identification information of a transmission source and physical identification information of the transmission source included in a data packet received at each communication port exists in the identification information table; a step of causing, when it is determined in the determination step that no network identification information of the transmission source exists in the identification information table, the computer to add the network identification information of the transmission source and the physical identification information of the transmission source to the identification information table; and a step of causing the computer to attach priority information corresponding to the physical identification information of the transmission source to the identification information table.

The computer program according to an eleventh aspect further includes a second determination step of causing, when it is determined in the determination step that the network identification information of the transmission source exists in the identification information table and no physical identification information of the transmission source exists in the identification information table, the computer to determine whether or not priority information corresponding to the physical identification information of the transmission source is higher than priority information corresponding to physical identification information associated with the network identification information of the transmission source in the identification information table; and a step of causing, when it is determined in the second determination step that the priority information corresponding to the physical identification information of the transmission source is higher than the priority information corresponding to the physical identification information associated with the network identification information of the transmission source in the identification information table, the computer to update the identification information table so as to associate the physical identification information of the transmission source with the network identification information.

BRIEF DESCRIPTION OF THE DRAWINGS

FIG. 3 shows the outline an ARP table.

FIG. 4 shows the outline of priority MAC address information.

FIG. 12 shows the outline of history information.

DESCRIPTION OF THE NUMERALS

Figure 1:
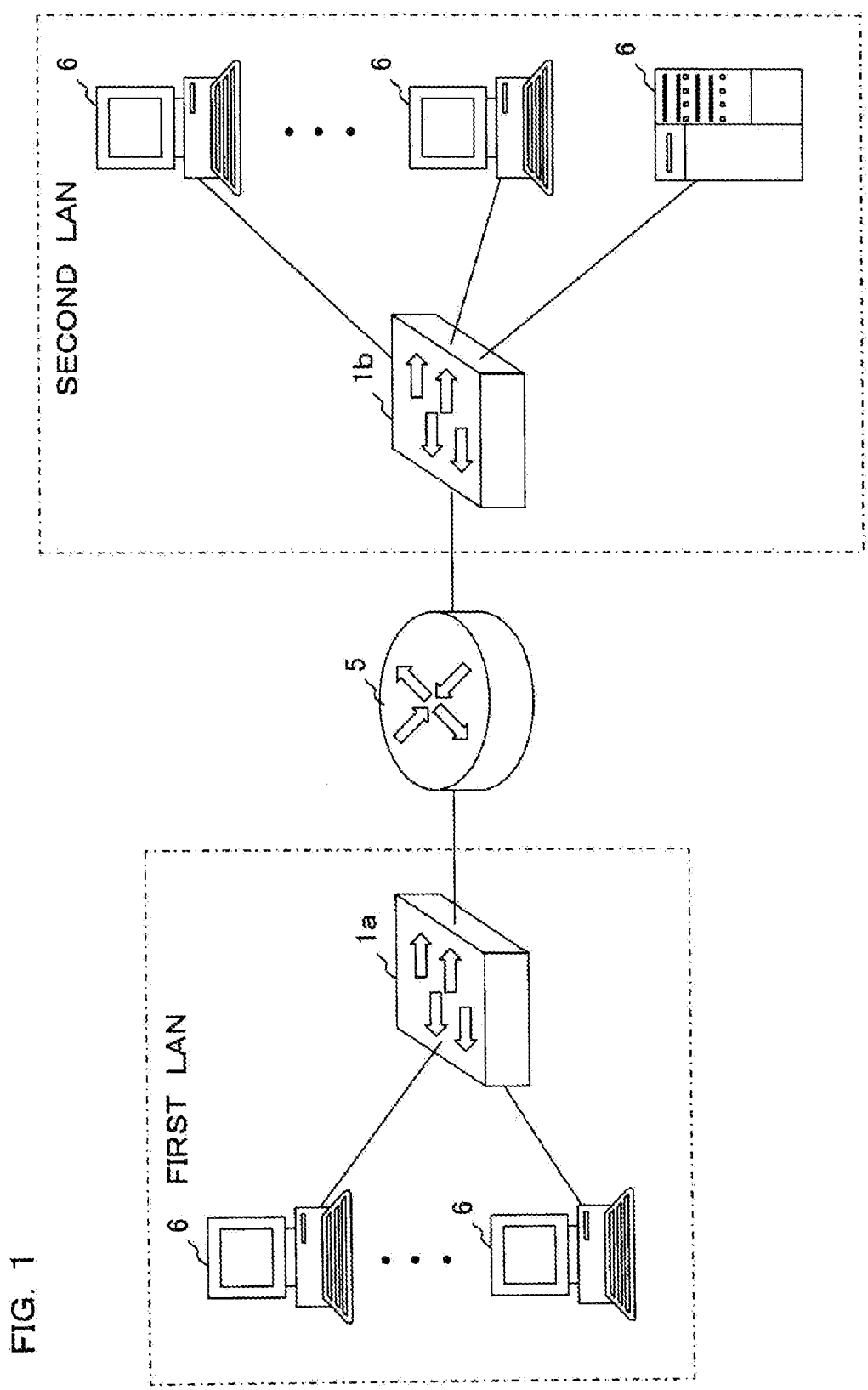
FIG. 1 is a block diagram showing the configuration of a TCP/IP network system of a mode in which a relay device according to the present embodiment is connected.

1 Switching hub device
10 Switching controller
11 Storage section
11a ARP table
11b Priority MAC address information
11c History information
12 ARP table controller
13 (13-1, 13-2, . . . , 13-N) Communication ports
14 Notification section

DETAILED DESCRIPTION

An object is to provide a relay device, a communication system, a communication method, and a computer program with which even when IP addresses of communication devices are duplicated, a communication device having a high communication priority is connected to a network in preference to others, thereby enabling prevention of non-arrival of a data packet to the communication device.

This technique will be described in detail below referring to the drawings showing the embodiment.

FIG. 1 is a block diagram showing the configuration of a TCP/IP network system of a mode in which a relay device according to the present embodiment is connected.

The TCP/IP network system has a configuration in which switching hub devices 1a and 1b as relay devices are connected to a router device 5 for connecting different networks (a first LAN and a second LAN in this case), and further communication devices 6, 6 are connected to the switching hub device 1a, and the communication devices 6, 6, 6 to the switching hub device 1b.

The router device 5 automatically selects an optimum path by deciding the IP address of a communication device, to which a data packet to be transmitted, and transfers the data packet to a switching hub device. In an example shown in FIG. 1, each communication device belongs to the same broadcast domain, communication devices for transmitting and receiving a data packet are connected through one or more than one switching hub device 1, and when a data packet is transmitted and received between the communication devices, the transmission and reception are performed through the switching hub device 1.

Figure 2:
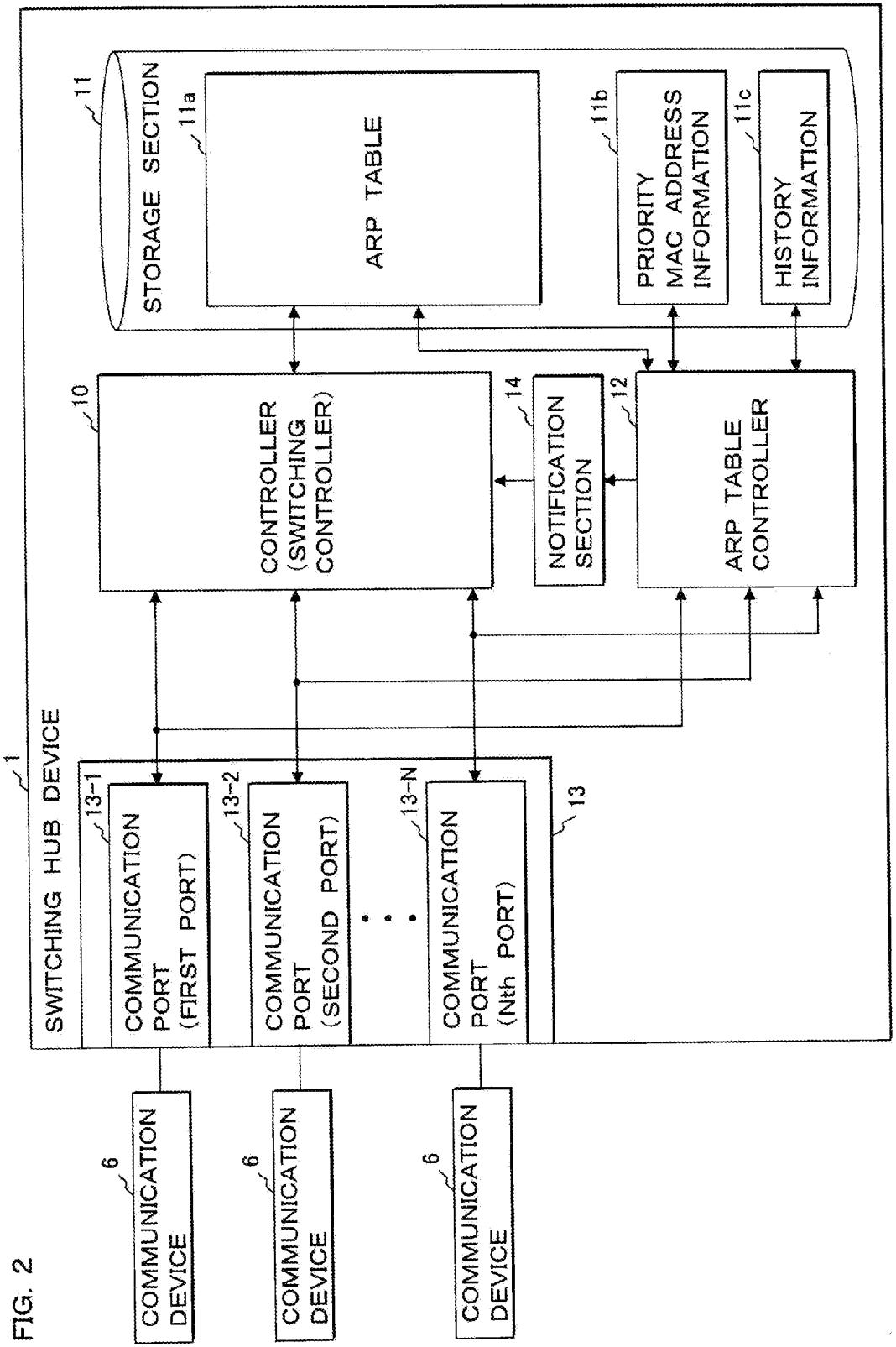
FIG. 2 is a block diagram showing the configuration of a switching hub device as a relay device according to the present embodiment.

FIG. 2 is a block diagram showing the configuration of a switching hub device as a relay device according to the present embodiment.

The switching hub device 1 as a relay device according to the present embodiment is provided with a controller (switching controller) 10, a storage section 11, an ARP table controller 12, a communication port 13 and a notification section 14.

Stored in the storage section 11 are an ARP table 11a, priority MAC address information 11b, and history information 11c. The communication port 13 is a section for connection with communication devices that perform transmission and reception of data packets, and includes a first port 13-1, a second port 13-2, ..., and an Nth port 13-N.

The switching controller 10 performs transmission and reception of data packets. Specifically, when receiving a data packet, the switching controller 10 selects a communication port 13 (any one of communication ports 13-1, 13-2, ..., and 13-N) to which a communication device of the receiving end is connected with reference to the ARP table 11a, and transfers the data packet to the selected communication port.

The ARP table 11a is a table for associating an IP address with a MAC address as shown in FIG. 3. The IP address is associated with the MAC address so as to allow a communication port to which a communication device identified with the MAC address is connected to be identified. In the present embodiment, further, priority information showing priority of communication is associated for each MAC address.

The priority information is information for identifying a communication device such as a server device or an IP telephone set, for which stopping service is not allowed, and is registered in a form of flag in the ARP table 11a. For example, when the flag is '1', the flag represents that the communication device 'has priority', whereas when the flag is '0', the flag represents that the communication device does 'not have priority (non-priority)'.

The ARP table controller 12 makes determination of the transmission source IP address and the transmission source MAC address of the received data packet with reference to the ARP table 11a, and updates the ARP table 11a, that is, additions and changes of the IP address and the MAC address are made, as needed.

The priority MAC address information 11b is information representing the MAC address of a communication device having communication priority as shown in FIG. 4, and is appropriately updated by an administrator. For example, when receiving the MAC address of a communication device having communication priority from a communication terminal device such as a PC connected to the communication port 13, the ARP table controller 12 adds the received MAC address to the priority MAC address information 11b. Also, it is possible to change and delete MAC addresses registered in the priority MAC address information 11b.

Also, the ARP table controller 12 stores the history information 11c of the received data packet in the storage section 11. The notification section 14 creates a notification that registration in the ARP table 11a is not made, in accordance with an instruction of the ARP table controller 12, and transmits the notification to the specified communication device via the switching controller 10. (Note that details on the history information 11c will be described later.)

Next, operations of the switching hub device 1 having a configuration as described above are described. First, a process of registering/updating the ARP table 11a by the switching hub device 1 is described by referring to the flowcharts shown in FIGS. 5 to 8.

Figure 5:
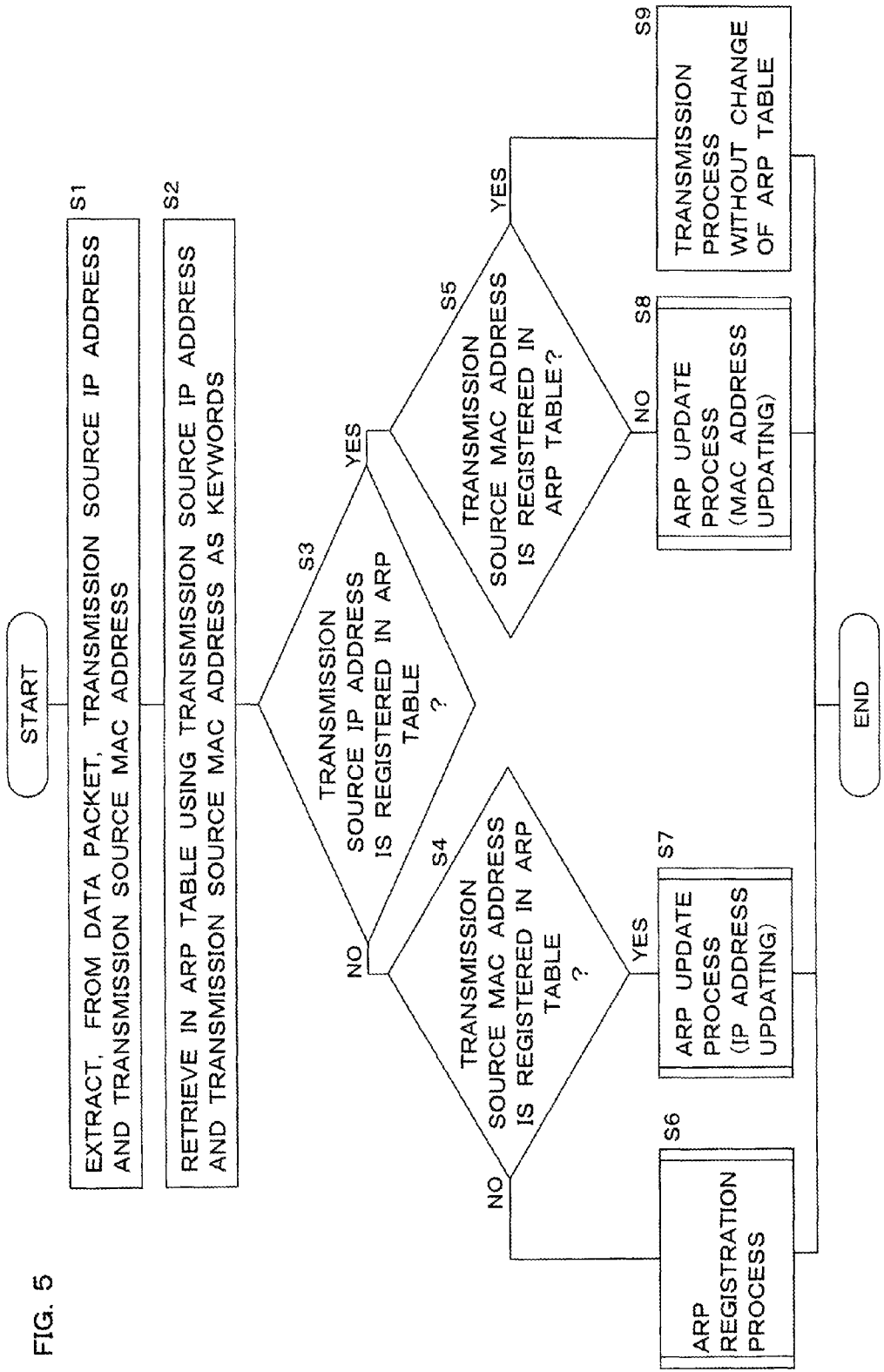
FIG. 5 is a flowchart showing a process of registering/updating the ARP table by a switching hub device.

As shown in FIG. 5, when a data packet transmitted from a communication device is received at the communication port 13 in a state in which the priority MAC address information 11b is registered from a communication terminal device, such as a PC, connected to the switching hub device 1, the ARP table controller 12 extracts, from the received data packet, a transmission source IP address and a transmission source MAC address included in the header. (Step S1). Then, using the transmission source IP address and the transmission source MAC address as keywords, the ARP table controller 12 retrieves whether or not the transmission source IP address and the transmission source MAC address are registered in the ARP table 11a (Step S2).

As a result of retrieval, it is determined whether or not the transmission source IP address is registered in the ARP table 11a (Step S3), and further it is determined whether or not the transmission source MAC address is registered in the ARP table 11a (Steps S4 and S5).

When it is determined that the transmission source IP address is not registered in the ARP table 11a (S3: NO), and further the transmission source MAC address is not registered in the ARP table 11a (S4: NO), an ARP registration process for registering the transmission source IP address and the transmission source MAC address in the ARP table 11a is performed (Step S6).

Figure 6:
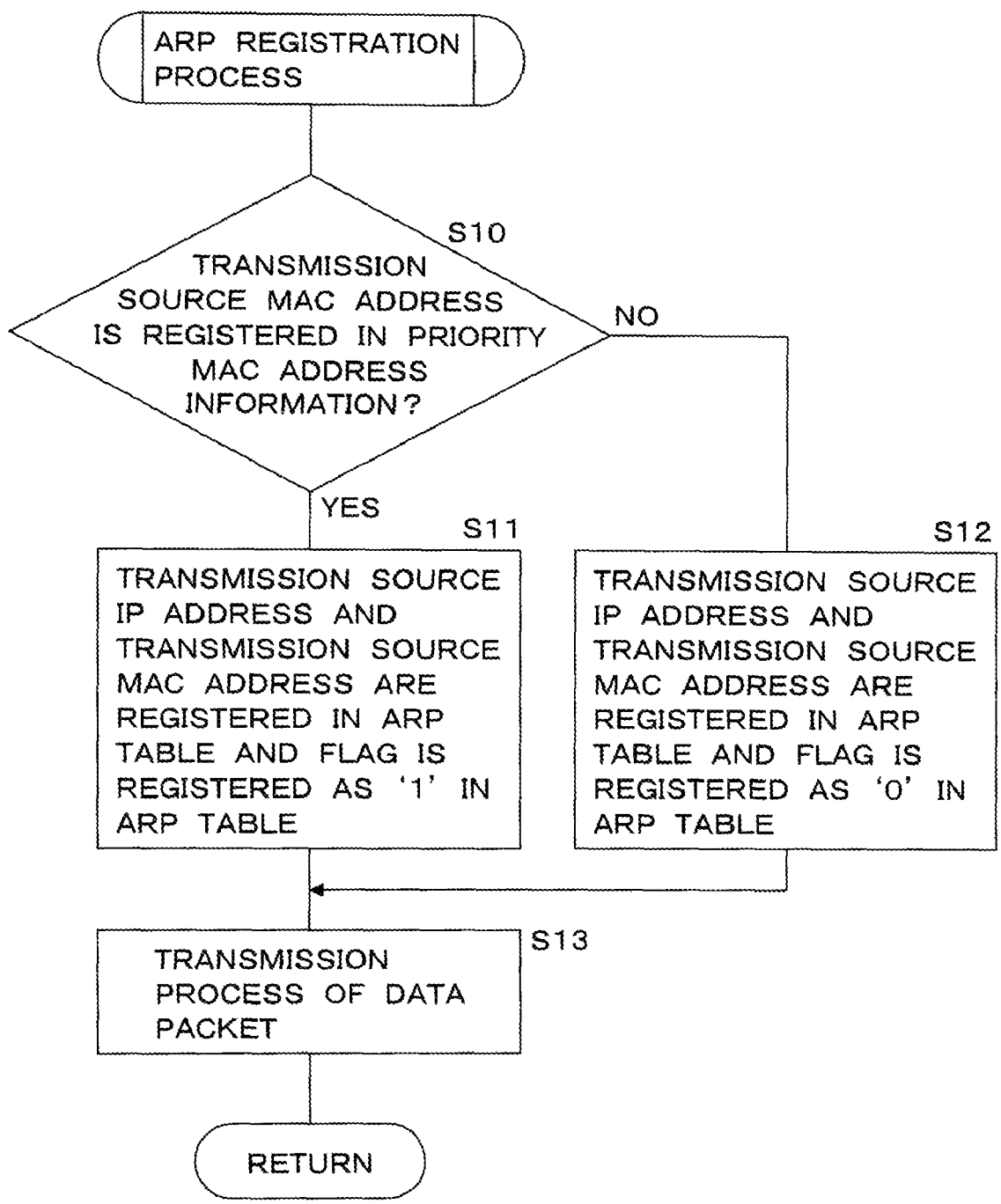
FIG. 6 is a flowchart showing the process of registering/updating the ARP table by the switching hub device.

In the ARP registration process, as shown in FIG. 6, it is first determined whether or not the transmission source MAC address is registered in the priority MAC address information 11b (Step S10).

When the transmission source MAC address is registered in the priority MAC address information 11b (S10: YES), the transmission source IP address and the transmission source MAC address are registered in the ARP table 11a and also a flag is registered as '1' in the ARP table 11a, thereby making registration to the effect that the communication priority of a communication device that has transmitted the data packet 'is priority' (Step S11). Then, according to the ARP table 11a, the receiving end for the data packet is specified and a transmission process is performed (Step S13).

When the transmission source MAC address is not registered in the priority MAC address information 11b (S10: NO), the transmission source IP address and the transmission source MAC address are registered in the ARP table 11a and a flag is registered as '0' in the ARP table 11a, thereby making registration to the effect that the communication priority of a communication device that has transmitted the data packet 'is non-priority' (Step S12). Then, the process proceeds to S13, and a transmission process is performed.

When it is determined that the transmission source IP address is not registered in the ARP table 11a (S3: NO) and the transmission source MAC address is registered in the ARP table 11a (S4: YES), an ARP update process (IP address updating) for updating an IP address associated with the transmission source MAC address of the ARP table 11a to the transmission source IP address is performed (Step S7).

Figure 7:
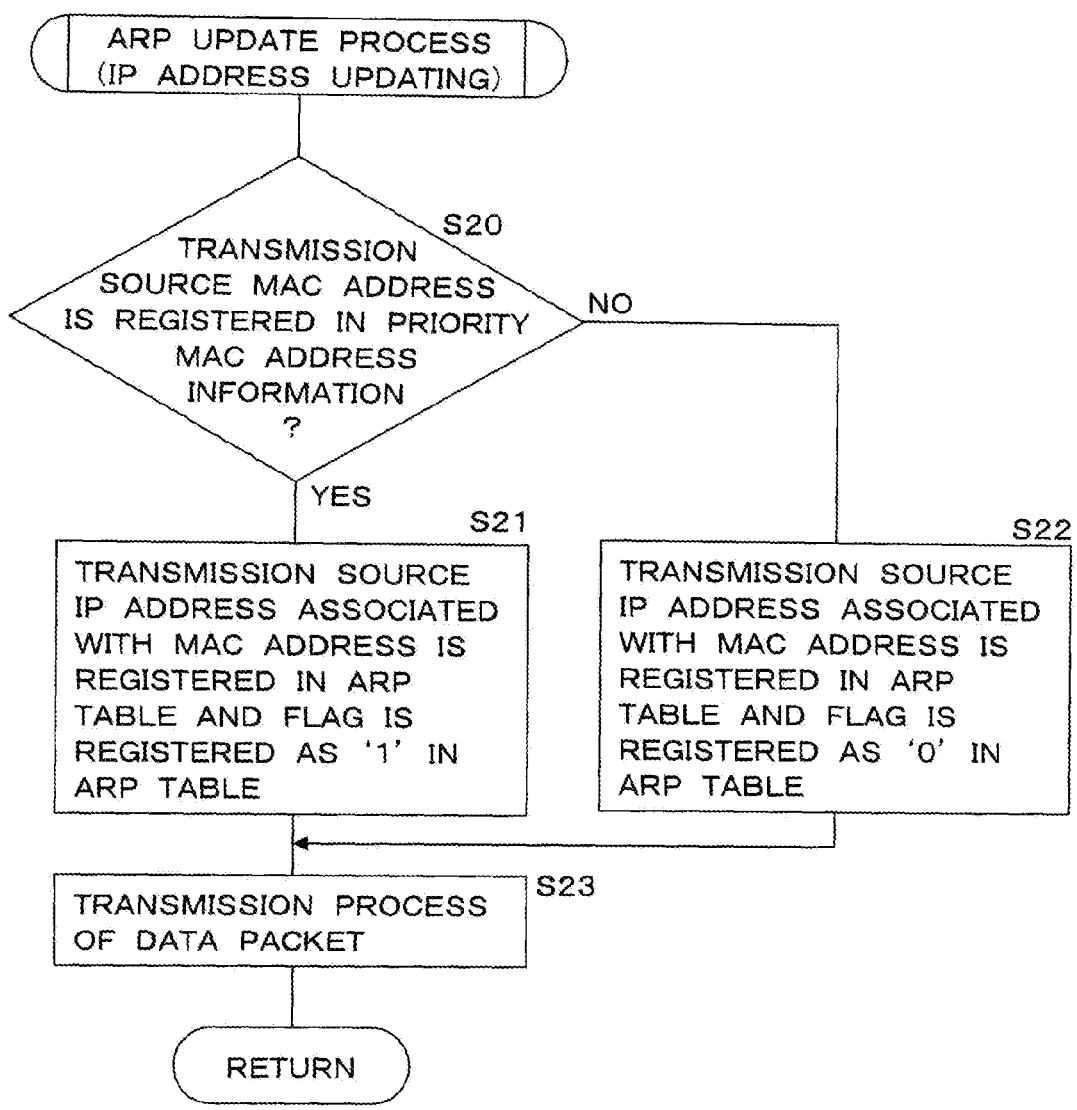
FIG. 7 is a flowchart showing the process of registering/updating the ARP table by the switching hub device.

In the ARP update process (IP address updating), as shown in FIG. 7, it is first determined whether or not the transmission source MAC address is registered in the priority MAC address information 11b (Step S20).

When the transmission source MAC address is registered in the priority MAC address information 11b (S20: YES), the transmission source IP address in a state of being associated with the MAC address is registered in the ARP table 11a and a flag is registered as '1' in the ARP table 11a, thereby making registration to the effect that the communication priority of a communication device that has transmitted the data packet is "priority" (Step S21). Then, according to the ARP table 11a, the receiving end for the data packet is specified and a transmission process is performed (Step S23).

When the transmission source MAC address is not registered in the priority MAC address information 11b (S20: NO), the transmission source IP address in a state of being associated with the MAC address is registered in the ARP table 11a and a flag is registered as '0' in the ARP table 11a, thereby making registration to the effect that the communication priority of a communication device that has transmitted the data packet 'is non-priority' (Step S22). Then, the process proceeds to S23, and a transmission process is performed. Note that this process differs from the ARP registration process described above in that an IP address associated with a transmission source MAC address of the ARP table 11a is rewritten to a transmission source IP address. In this way, a plurality of IP addresses are prevented from being registered to one MAC address.

When it is determined that the transmission source IP address is registered in the ARP table 11a (S3: YES) and the transmission source MAC address is not registered in the ARP table 11a (S5: NO), an ARP update process (MAC address updating) for appropriately updating a MAC address associated with the transmission source IP address of the ARP table 11a to the transmission source MAC address is performed (Step S8).

Figure 8:
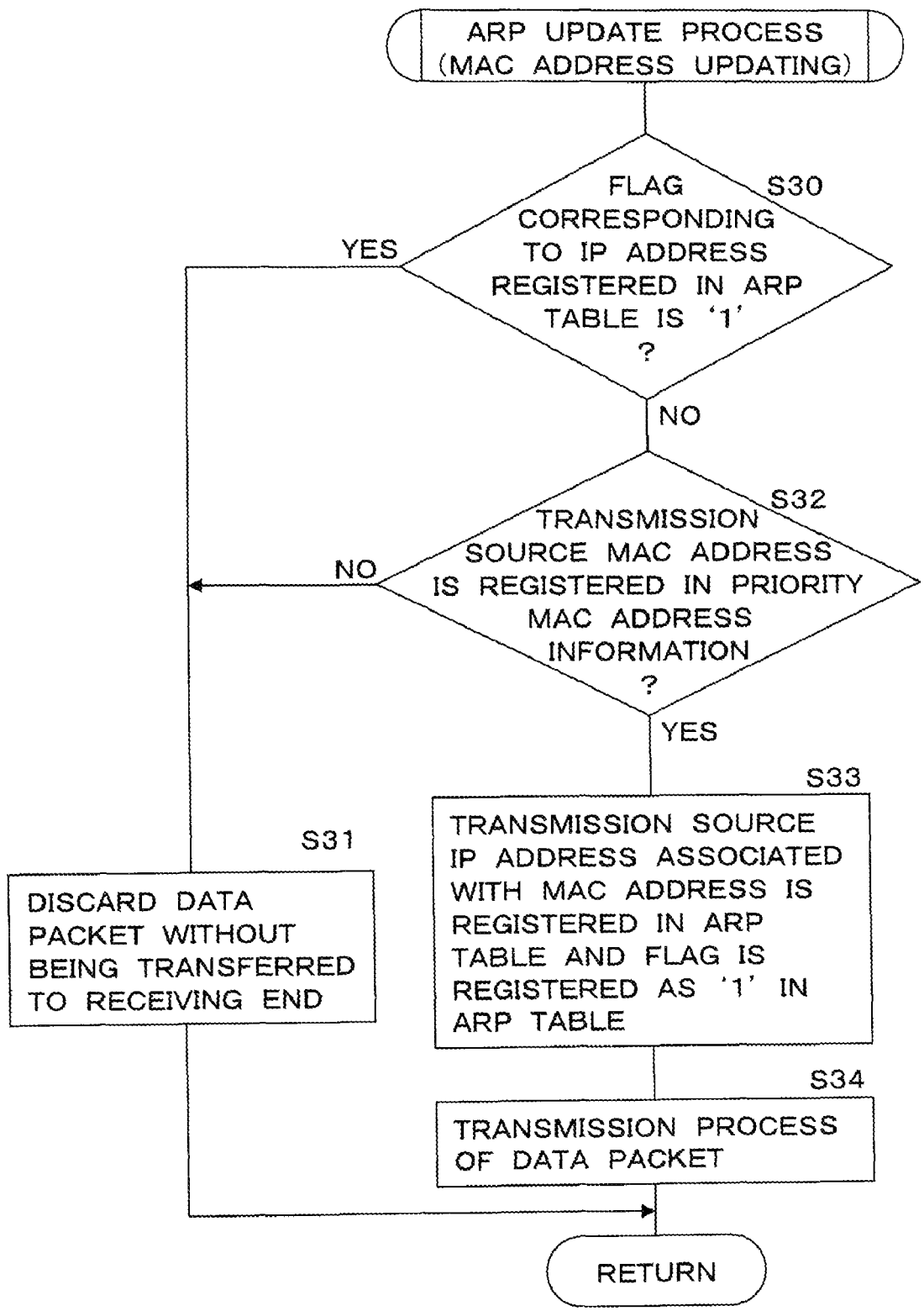
FIG. 8 is a flowchart showing the process of registering/updating the ARP table by the switching hub device.

In the ARP update process (MAC address updating), as shown in FIG. 8, a communication device having the same IP address as that of a communication device that has transmitted a data packet is connected to the switching hub device 1. Therefore, in order to decide which communication device has a high communication priority, it is determined whether or not the communication priority corresponding to an IP address registered in the ARP table 11a 'is priority', that is, the flag is '1' (Step S30). In other words, it is checked whether or not to give priority to communication of a communication device that is already connected.

When the flag corresponding to the IP address registered in the ARP table 11a is '1' (S30: YES), it is decided that priority is given to communication of the communication device that has already been registered in the ARP table 11a over that of a communication device that has transmitted this data packet, and the received data packet is discarded without being transferred to the receiving end (Step S31). The MAC address of this communication device is never registered in the ARP table 11a, and even in a case where IP addresses are duplicated, the MAC address of a communication device having a high communication priority is never updated to the MAC address of a communication device having a low communication priority When the flag corresponding to the IP address registered in the ARP table 11a is not '1' (S30: NO), the communication priority of a communication device that has already been registered in the ARP table 11a is low. Therefore, next, in order to decide whether or not the communication priority of a communication device that has transmitted a data packet is high, it is determined whether or not the transmission source MAC address included in a data packet is registered in the priority MAC address information 11b (Step S32).

When the transmission source MAC address is registered in the priority MAC address information 11b (S32: YES), the transmission source MAC address in a state of being associated with the IP address is registered in the ARP table 11a and a flag is registered as '1' in the ARP table 11a, thereby making registration to the effect that the communication priority of a communication device that has transmitted the data packet 'is priority' (Step S33). Then, according to the ARP table 11a, the receiving end for the data packet is specified and a transmission process is performed (Step S34).

Figure 9:
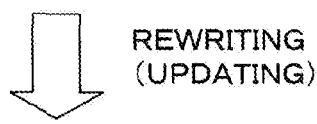
FIG. 9 shows the outline of updating process of the ARP table (MAC address update).

Note that in S33, as shown in FIG. 9, the MAC address corresponding to an IP address that has already been registered in the ARP table 11a is rewritten (updated). Thus, in a case where IP addresses are duplicated, the MAC address of a communication device having a low communication priority is updated to the MAC address of a communication device having a high communication priority. In this way, even in a case where IP addresses are duplicated, the MAC address of a communication device having a high communication priority is always associated with the IP address, so that only one set of an IP address and a MAC address is registered in the ARP table 11a.

When the transmission source MAC address is not registered in the priority MAC address information 11b (S32: NO), it is decided that priority is given to communication of the communication device that has already been registered in the ARP table 11a over that of the communication device that has transmitted this data packet, and then the process proceeds to S31 and the received data packet is discarded without being transferred to the receiving end. In this way, priority is given to communication of the communication device that has first been registered in the ARP table 11a (when the priorities are the same, priority is given to a communication device connected earlier).

When it is determined that the transmission source IP address is registered in the ARP table 11a (S3: YES) and further the transmission source MAC address is registered in the ARP table 11a (S5: YES), the receiving end for a data packet is specified and a transmission process is performed according to the ARP table 11a without a change of the ARP table 11a (Step S9).

A TCP/IP network system is configured using the switching hub device 1 with a configuration as described above, thereby allowing priority to be given to communication of a data packet of a communication device with the communication priority specified as 'priority' (the flag being '1') as follows.

Figure 10:
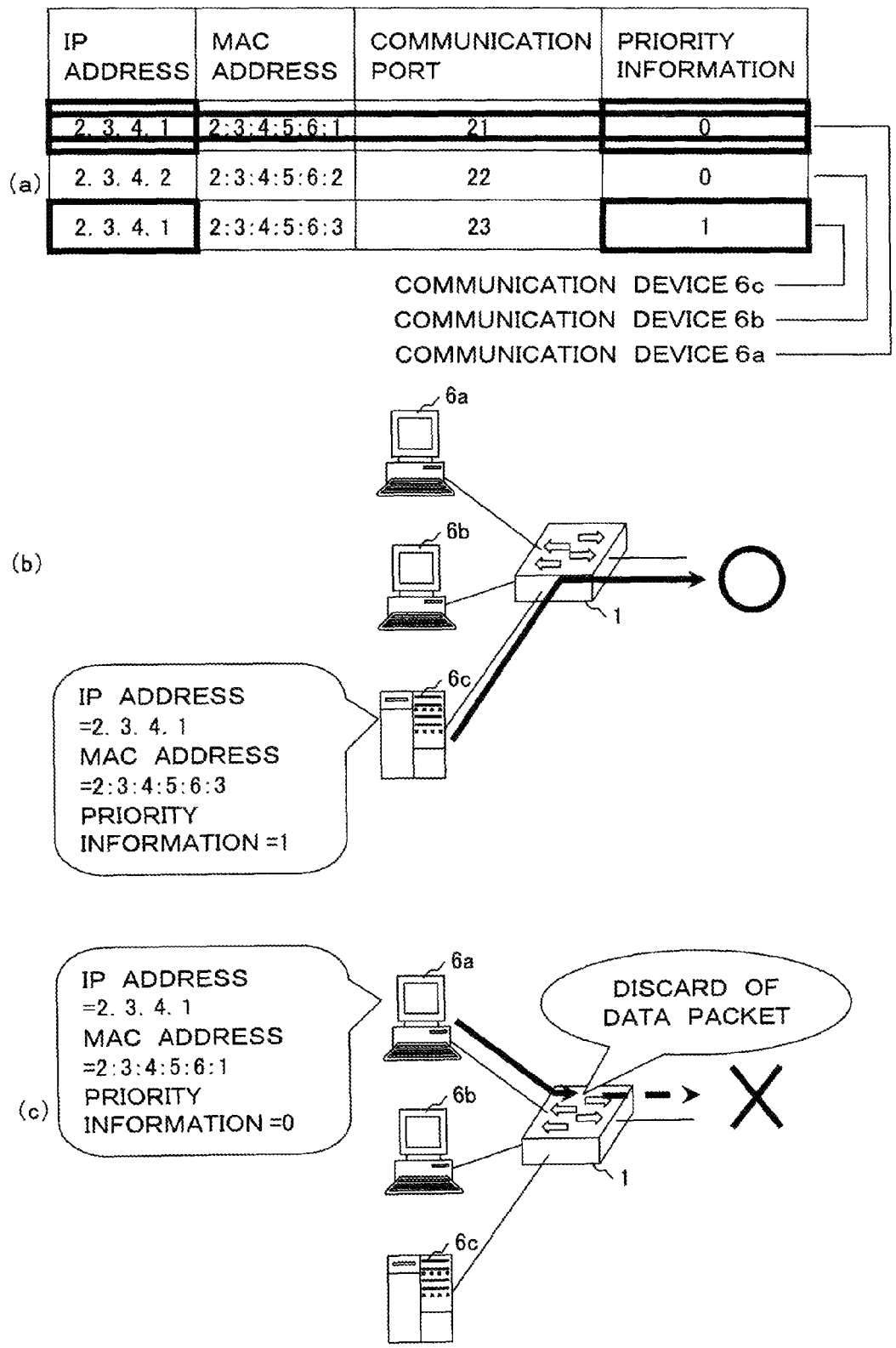
FIGS. 10A to 10C show transmission examples of data packets from communication devices connected to the switching hub device.

As shown in FIGS. 10A to 10C, in a case where data packets are transmitted from communication devices 6a, 6b and 6c connected to the switching hub device 1, even in a case where IP addresses of the communication devices 6a and 6c are duplicated, information on the communication device 6a disappears from the ARP table 11a when the communication device 6c is connected (FIG. 10A). This is because the communication priority of the communication device 6a 'is non-priority' (the flag being '0') and the communication priority of the communication device 6c 'is priority' (the flag being '1'). Accordingly, while a data packet can be transmitted from the communication device 6c via the switching hub device 1 (FIG. 10B), transmission of the data packet from the communication device 6a can be prevented since the data packet is discarded in the switching hub device 1 (FIG. 10C).

Therefore, for example, it is assumed that connection is established to the switching hub device 1 by a malicious third party by using the same IP address as that of an important communication device such as a server device, and the IP address and the MAC address of the communication device of the third party are registered in the ARP table 11a. Even in this case, provided that the MAC address of the important communication device such as a server device is registered in the priority MAC address information 11b, in a case where an important communication device such as a server device is connected later, the initially registered MAC address of a communication device of the third party is changed to the MAC address of the important communication device such as a server device. Improvement in security may thus be achieved.

In particular, in recent years, electronic commerce such as on-line shopping has been spreading to ordinary households. They expose themselves to danger that personal information such as a name, address, telephone number, and credit card number of a buyer is exploited by a masquerade as a server device of a seller. In such a situation, this technique is extremely useful.

Figure 11:
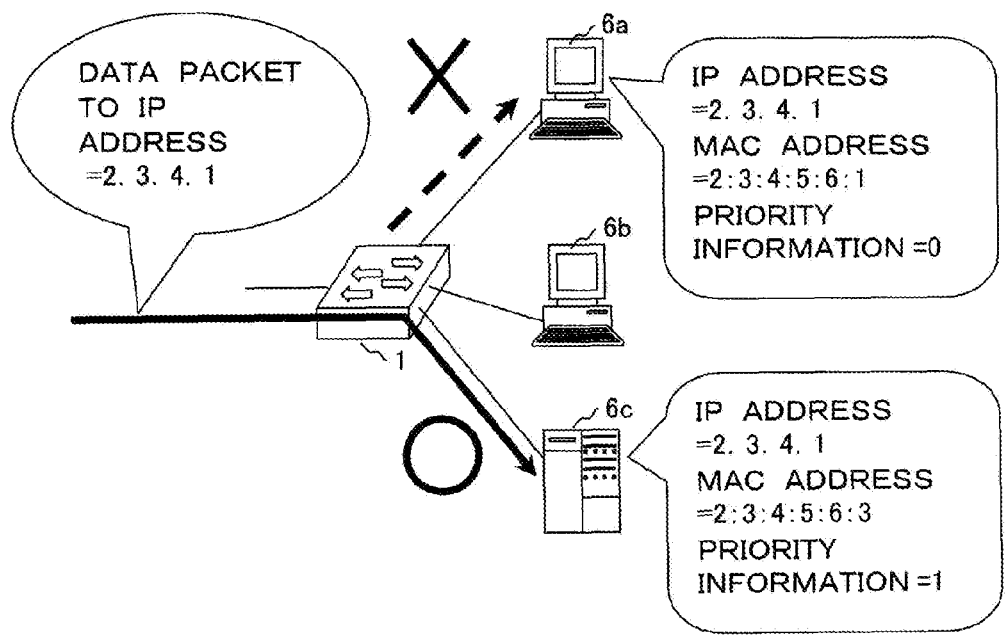
FIGS. 11A and 11B show transmission examples of data packets to communication devices connected to the switching hub device.

In a case where a data packet is transmitted to a communication device connected to the switching hub device 1, it is assumed that the IP address of the communication device is duplicated with another as shown in FIGS. 11A and 11B. Even in this case, in the switching hub device 1 of the present embodiment, since only one set of an IP address and a MAC address is registered in the ARP table 11a, and the MAC address of a communication device having a communication priority registered as 'priority' is registered in the ARP table 11a in preference to others (FIG. 11A), the data packet is transmitted from the switching hub device 1 to the communication device having a high priority (FIG. 11B.

In other words, transfer of a data packet to a communication device registered as 'having non-priority' is eliminated, but a data packet is transferred to at least a communication device registered as 'priority' in preference to others. Therefore, communication to an important communication device, such as a server device or an IP telephone set, for which stopping communication is not wished, can be ensured, resulting in prevention of non-arrival of a data packet.

In the registering process of the ARP table 11a performed by the switching hub device 1, the IP address and MAC address of a transmission source whose data packet has been discarded are recorded in the history information 11c, and based on the recorded history information 11c, it is decided whether or not to update the ARP table 11a.

For example, the ARP table controller 12 is designed to store in the storage section 11 the history information 11c including a receiving date and the IP address and MAC address of the transmission source regarding the discarded data packet as shown in FIG. 12. The ARP table controller 12 determines whether or not the transmission source MAC address of a data packet exists in the history information 11c and further whether or not the transmission source IP address of the data packet exists in the history information 11c.

When the IP address exists in the history information 11c, the ARP table controller 12 does not add the transmission source IP address and transmission source MAC address of the data packet to the ARP table 11a. On the other hand, when the IP address does not exist in the history information 11c, the ARP table controller 12 adds the transmission source IP address and transmission source MAC address of the data packet to the ARP table 11a.

In this way, a combination of the transmission source IP address and transmission source MAC address of a data packet deleted in the past is never added to the ARP table 11a. This is because the same transmission source IP address and transmission source MAC address as those in the past have a high risk of being erroneously set and a high possibility that this IP address is masqueraded by a malicious third party. Note that it is conceivable that registering of the MAC address of a data packet deleted in the past in the ARP table is made impossible. However, there may be a simple erroneous setting. Therefore, registering in the ARP table 11a is rejected only when both the transmission source IP address and the transmission source MAC address agree with those of a data packet deleted in the past.

Further, the ARP table controller 12 specifies a communication device having the IP address and the MAC address decided not to be added (not to be registered) to the ARP table 11a by referring to the history information 11c, and instructs the notification section 14 to notify the communication device. Following the instruction of the ARP table controller 12, the notification section 14 creates a notification to the effect that the address(es) are not registered in the ARP table 11a, and transmits the notification via the switching controller 10 to the specified communication device. In this way, the user of the communication device can grasp duplication of the IP address by the notification. Also, as in a conventional way, when a failure occurs in communication, failure information may be created and notified to each communication device.

Figure 13:
FIG. 13 shows the outline of a reset process of the ARP table.

Further, the ARP table controller 12 resets the ARP table 11a except for the MAC address with priority information being high and the IP address associated with the priority information in the ARP table 11a. That is, as shown in FIG. 13, an IP address=1.2.3.2 and a MAC address=1.2.3.4.5.2, an IP address=1.2.3.3 and a MAC address=1.2.3.4.5.3, and an IP address=1.2.3.5 and a MAC address=1.2.3.4.5.5, for which priority information is '0', are deleted from the ARP table 11a. On the other hand, an IP address=1.2.3.1 and a MAC address=1.2.3.4.5.1, and an IP address=1.2.3.4 and a MAC address=1.2.3.4.5.4, for which priority information is '1', are not deleted from the ARP table 11a.

In this way, information on the IP address and the MAC address for which priority information is '1' is not deleted by a process of resetting the ARP table 11a. Therefore, there is no possibility at all that a malicious third party establishes connection to the switching hub device 1 using the same IP address as that of an important communication device such as a server device, and registers the IP address and the MAC address of a communication device of the third party in the ARP table 11a during the reset process. Therefore, further improvement in security may be achieved.

Figure 14:
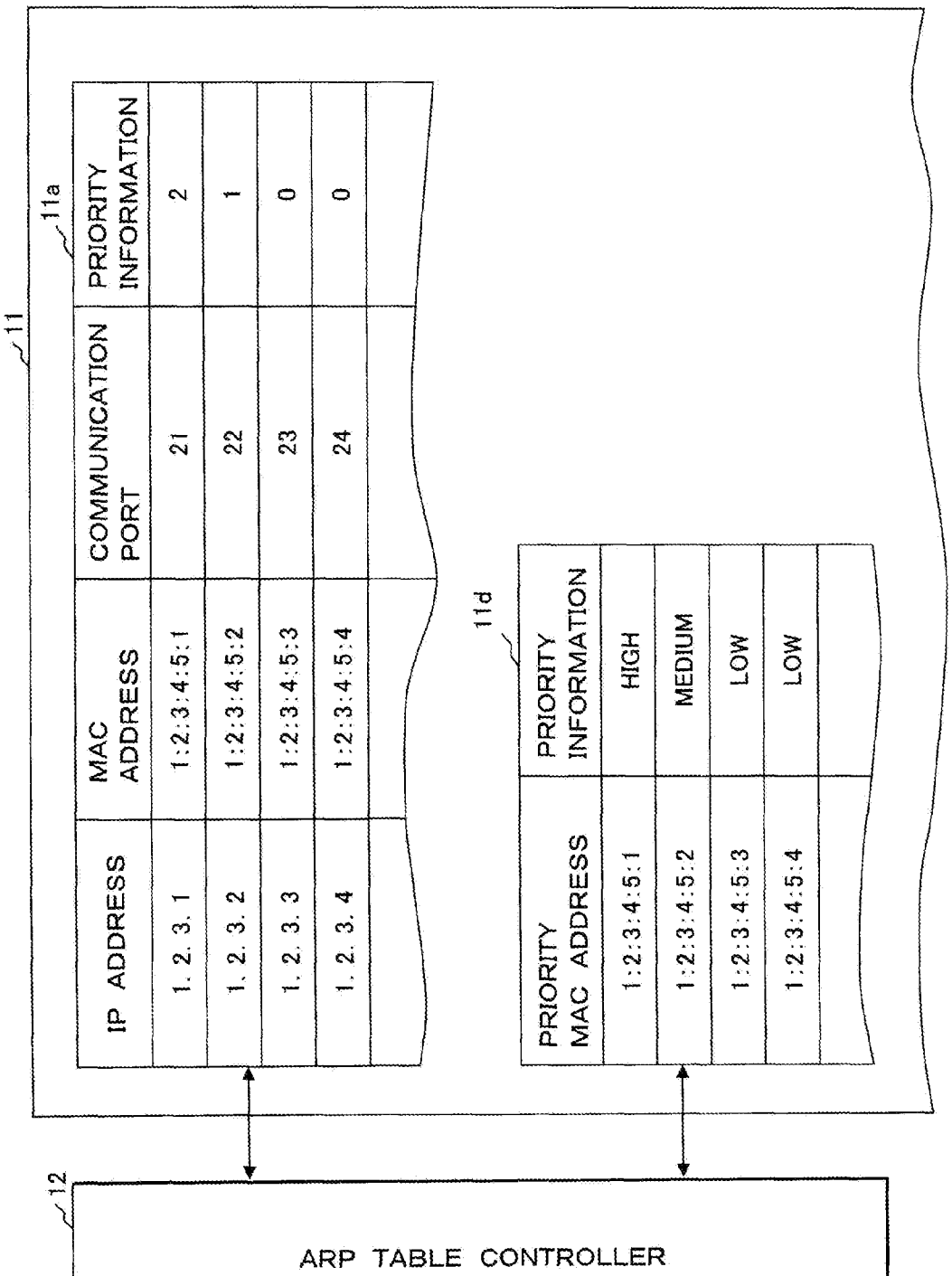
FIG. 14 is a block diagram showing the main portion of another configuration of the switching hub device as the relay device according to the present embodiment.
Figure 15:
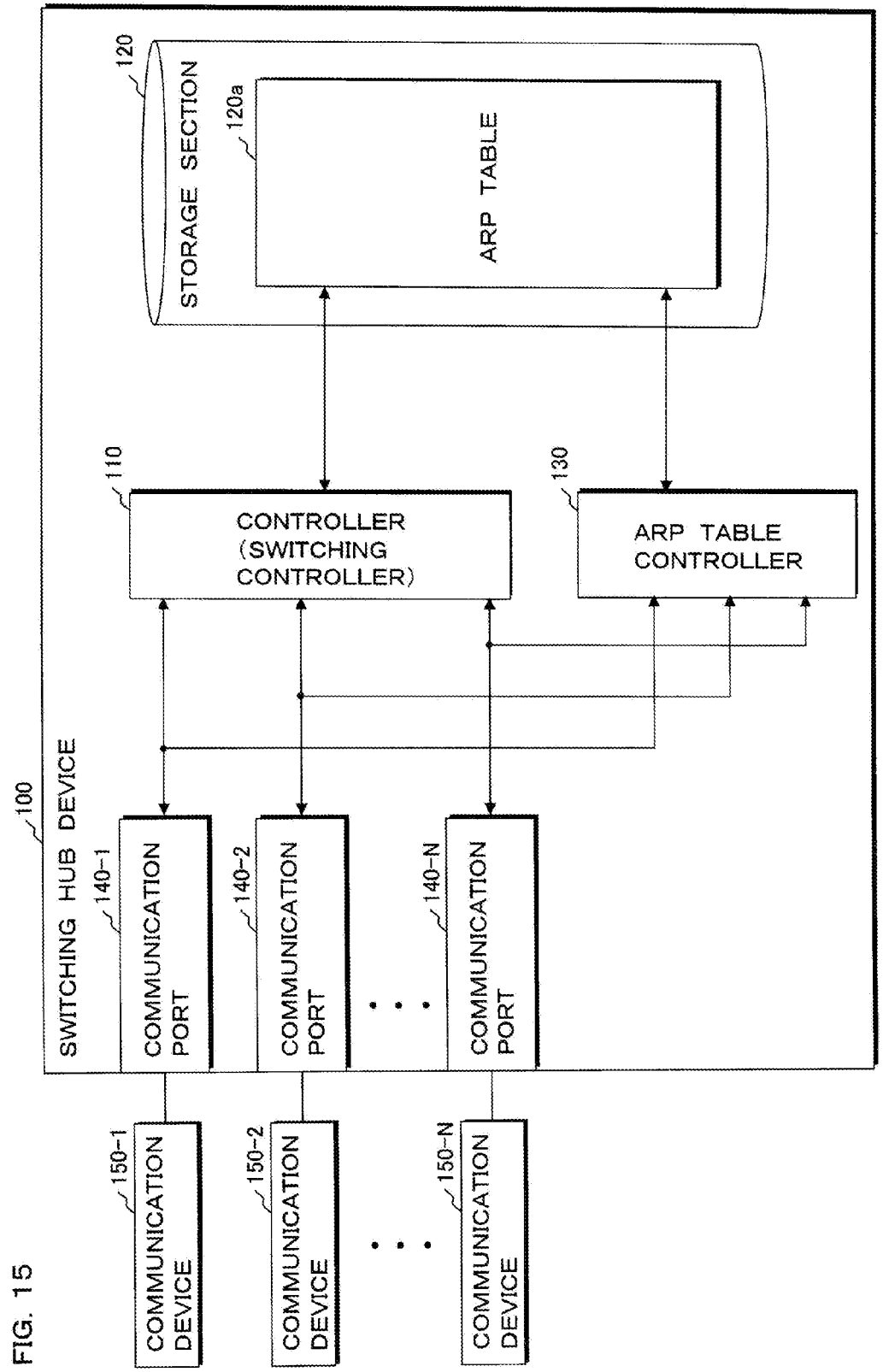
FIG. 15 is a block diagram showing the configuration of a switching hub device as a conventional relay device.
Figure 16:
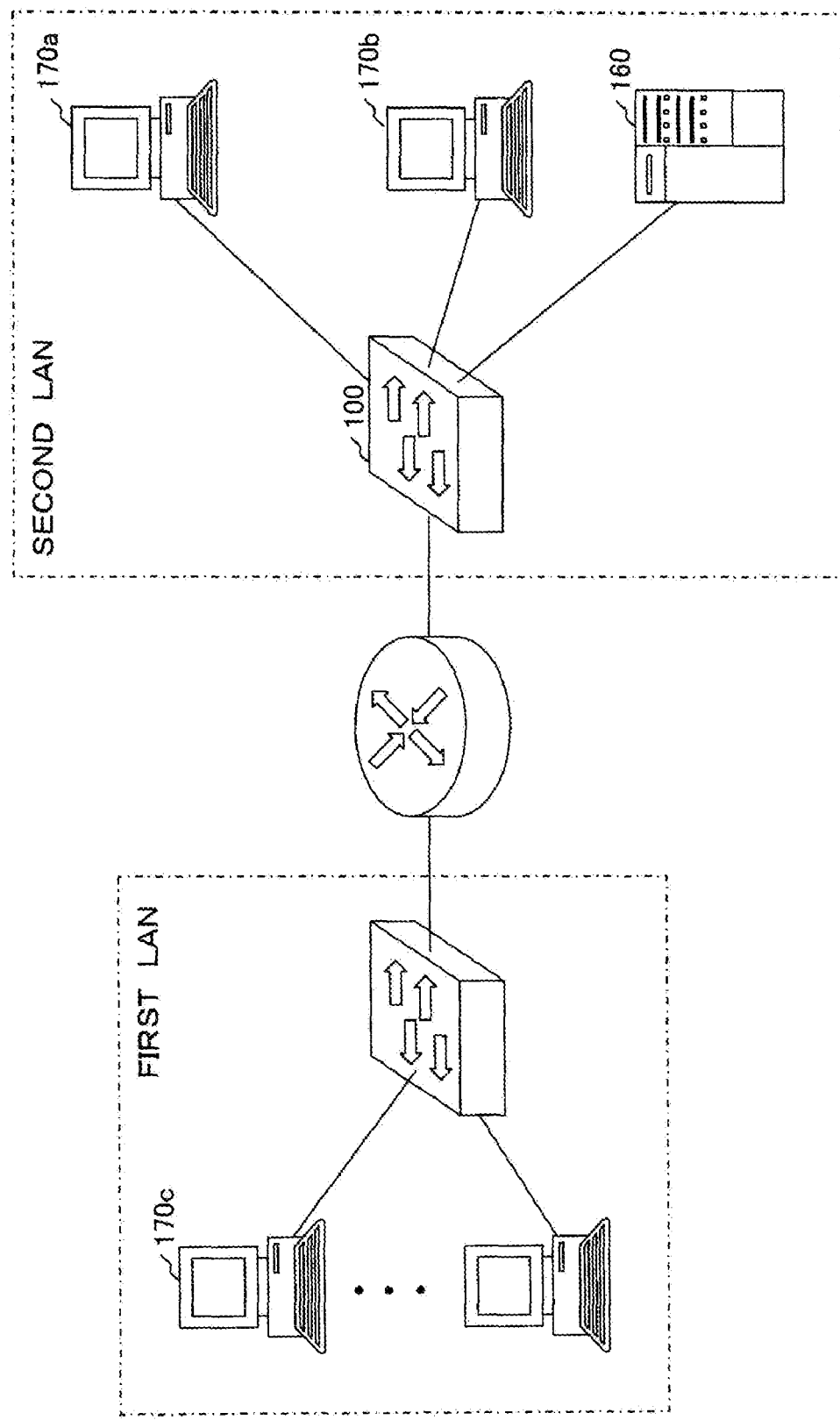
FIG. 16 is a view for illustrating conventional problems.

It should be noted that although description has been given on a case where priority information representing a communication priority is in a binary format for simplicity in description in the embodiment, the priority information may be in a multiple-valued format (ternary or more). For example, as shown in FIG. 14, a communication priority table 11d in which the communication priority is classified into 'High', 'Medium', and 'Low' is stored in the storage section 11. The ARP table controller 12 registers a flag corresponding to the communication priority in the ARP table 11a by referring to the communication priority table 11d. For example, a flag of '2' represents that the communication priority of the communication device is 'High', a flag of '1' represents that the communication priority of the communication device is 'Medium', and a flag of '0' represents that the communication priority of the communication device is 'Low'.

In such a way, communication priorities are provided with a plurality of orders. For example, the most important communication device such as a server device has the highest priority, an important communication device such as a communication terminal device of a network administrator has the second priority, and a communication device such as a communication terminal device of an ordinary user has non-priority. This allows priorities of communication to be managed in a fractionalized manner.

While a MAC address is used as identification information for physically identifying a communication device in the embodiment, the name of a device, the name of a main user and the like may also be used that are information uniquely specifying a communication device.

In the embodiments, network identification information that identifies on a network each of communication devices connected to a plurality of communication ports provided in a relay device and physical identification information that physically identifies each of the communication devices are associated as an identification information table, and also priority information that represents the communication priority of each of the communication devices is received and the received priority information is associated with the physical identification information of the communication device. Then, it is determined whether or not network identification information of the transmission source and physical identification information of the transmission source included in a data packet received at each communication port exist in the identification information table. When it is determined that no network identification information of the transmission source exists in the identification information table, the network identification information of the transmission source and the physical identification information of the transmission source are added to the identification information table, and also priority information corresponding to the physical identification information of the transmission source is attached to the identification information table. Thus, in the identification information table, the network identification information, the physical identification information and the priority information of a communication device are associated.

In the embodiments, when it is determined that the network identification information of the transmission source exists in the identification information table and no physical identification information of the transmission source exists in the identification information table, then it is determined whether or not priority information corresponding to the physical identification information of the transmission source is higher than priority information corresponding to the physical identification information associated with the network identification information of the transmission source in the identification information table. When it is determined that the priority information corresponding to the physical identification information of the transmission source is higher than the priority information corresponding to the physical identification information associated with the network identification information of the transmission source in the identification information table, the identification information table is updated so as to associate the physical identification information of the transmission source with the network identification information of the transmission source. Thus, in a case where the network identification information is duplicated, the MAC address of a communication device having higher priority information is stored in the identification information table.

In the embodiments, when it is determined that the priority information corresponding to the physical identification information of the transmission source is lower than the priority information corresponding to the physical identification information associated with the network identification information of the transmission source in the identification information table, the data packet is discarded.

In the embodiments, the network identification information and the physical identification information of the transmission source of the discarded data packet are recorded in the history information. Next, it is determined whether or not the physical identification information included in the transmitted data packet exists in the history information and further whether or not the network identification information included in the data packet exists in the history information. When it is determined that the network identification information included in the data packet exists in the history information, the network identification information and the physical identification information included in the data packet are not added to the identification information table.

In the embodiments, when it is determined that no network identification information included in the data packet exists in the history information, the network identification information and the physical identification information included in the data packet are added to the identification information table.

In the embodiments, the identification information table is reset except for the physical identification information with the priority information being high and the network identification information associated with the priority information in the identification information table.

In the embodiments, the network identification information of a receiving end included in the data packet received at each communication port is translated into the physical identification information with reference to the identification information table. Then, the data packet is transferred to a communication device having the translated physical identification information.

In the embodiments, a communication device is connected to each communication port of the above-described relay device, and communication is made between communication devices.

In the embodiments, the relay device receives priority information representing the communication priority of each communication device, and associates the received priority information with the physical identification information of the communication device. When no network identification information of the transmission source included in a data packet received at each communication port exists in the identification information table, the network identification information of the transmission source and the physical identification information of the transmission source are added to the identification information table, and also priority information corresponding to the physical identification information of the transmission source is attached to the identification information table. On the other hand, when the network identification information of the transmission source exists in the identification information table, no physical identification information of the transmission source exists in the identification information table, and further the priority information corresponding to the physical identification information of the transmission source is higher than the priority information corresponding to the physical identification information associated with the network identification information of the transmission source in the identification information table, the identification information table is updated so that the physical identification information of the transmission source is associated with the network identification information. This allows the same network identification information to be prevented from being registered to be duplicated in the identification information table to specify the receiving end of the received data packet such that the receiving end is limited to one.

In the embodiments, the computer is caused to receive priority information representing the communication priority of each communication device and to associate the received priority information with the physical identification information of the communication device. Then, the computer is caused to determine whether or not the network identification information of the transmission source and the physical identification information of the transmission source included in the received data packet at each communication port exist in the identification information table. When it is determined that no network identification information of the transmission source exists in the identification information table, the computer is caused to add the network identification information of the transmission source and the physical identification information of the transmission source to the identification information table and also to attach the priority information corresponding to the physical identification information of the transmission source to the identification information table.

In the embodiments, when it is determined that the network identification information of the transmission source exists in the identification information table and no physical identification information of the transmission source exists in the identification information table, the computer is caused to determine whether or not priority information corresponding to the physical identification information of the transmission source is higher than priority information corresponding to physical identification information associated with the network identification information of the transmission source in the identification information table. Then, when it is determined that the priority information corresponding to the physical identification information of the transmission source is higher than the priority information corresponding to the physical identification information associated with the network identification information of the transmission source in the identification information table, the computer is caused to update the identification information table so as to associate the physical identification information of the transmission source with the network identification information of the transmission source.

With the present aspects, even in a case where communication devices have duplicated network identification information, the physical identification information of a communication device having a high communication priority is always associated with its network identification information, so that only one set of network identification information and physical identification information is registered in the identification information table. Therefore, a communication device having a high communication priority is connected to a network in preference to others, thereby enabling prevention of non-arrival of a data packet to the communication device.

With the present aspects, when it is determined that priority information corresponding to the physical identification information of a transmission source is lower than priority information corresponding to physical identification information associated with the network identification information of the transmission source in the identification information table, the data packet is discarded. Thus there is no possibility of transmitting a data packet from the relay device to an outside network.

Therefore, assuming that a third party that bears malice connects to a relay device a terminal for which the same network identification information as that of an important communication device such as a server device is set, and the network identification information and the physical identification information of a communication device of the third party are registered in an identification information table, in a case where the important communication device such as a server device is connected later, the initially registered physical identification information of the communication device of the third party can be changed to the physical identification information of the important communication device such as a server device. Excellent effects such as improvement in security may thus be achieved.

What is claimed is:

1. A relay device for connecting hardware communication devices to a network, the relay device comprising:
a housing for enclosing the relay device;
a plurality of communication ports connected to the communication devices respectively, the plurality of communication ports communicatively coupled to the relay device; and
an identification information table in which network identification information identifying each communication device on the network is associated with physical identification information physically identifying the communication device;
a processor configured to execute an operation including:
associating a priority representing a communication priority of each communication device with the physical identification information of the communication device;
determining whether or not network identification information of a transmission source and physical identification information of the transmission source included in a data packet received at each communication port exist in the identification information table;
registering physical identification information identifying a communication device to be prioritized;
adding the network identification information of the transmission source and the physical identification information of the transmission source to the identification information table in accordance with the registered physical identification information, when a first determining section determines that no network identification information of the transmission source exists in the identification information table in accordance with the physical identification information registered; and
attaching a priority corresponding to the physical identification information of the transmission source to the identification information table, and
wherein the hardware communication devices are arranged outside the housing, the network identification information is an IP address, and the physical identification information is a MAC address.

2. The relay device according to claim 1, wherein the operation by the processor comprises:
determining whether or not the priority corresponding to the physical identification information of the transmission source is higher than a priority corresponding to physical identification information associated with the network identification information of the transmission source in the identification information table, when determining the network identification information of the transmission source exists in the identification information table and no physical identification information of the transmission source exists in the identification information table; and
updating the identification information table so as to associate the physical identification information of the transmission source with the network identification information when determining the priority corresponding to the physical identification information of the transmission source is higher than the priority corresponding to the physical identification information associated with the network identification information of the transmission source in the identification information table.

3. The relay device according to claim 2, wherein the operation by the processor includes discarding the data packet when determining the priority corresponding to the physical identification information of the transmission source is lower than the priority corresponding to the physical identification information associated with the network identification information of the transmission source in the identification information table.

4. The relay device according to claim 3, wherein the operation by the processor comprises:
recoding, in history information, the network identification information and the physical identification information of the transmission source of the discarded data packet; and
determining whether or not physical identification information included in a transmitted data packet exists in the history information and further whether or not network identification information included in the data packet exists in the history information, and when is determined that the network identification information included in the data packet exists in the history information, the processor does not add the network identification information and the physical identification information included in the data packet to the identification information table.

5. The relay device according to claim 4, wherein when determining no network identification information included in the data packet exists in the history information, the processor adds the network identification information and the physical identification information included in the data packet to the identification information table.

6. The relay device according to claim 1, wherein the operation by the processor includes resetting the identification information table except for physical identification information with a priority being high and network identification information associated with the priority in the identification information table.

7. The relay device according to claim 1, wherein
the operation by the processor comprises:
specifying, with reference to the identification information table, physical identification information based on network identification information of a receiving end included in the data packet received at each communication port; and
transferring the data packet to a communication device having the specified physical identification information specified.

8. A communication system comprising:
the relay device according to claim 1; and
communication devices connected respectively to the communication ports of the relay device, wherein
communication is made between the respective communication devices.

9. A communication method of, with a relay device for connecting to a network a communication device connected to each of a plurality of communication ports, performing transmission with a receiving end of a received data packet specified by referring to an identification information table in which network identification information identifying each communication device on the network is associated with physical identification information physically identifying the communication device, the communication method comprising:
associating a priority representing a communication priority of each
communication device with physical identification information of the communication device;
registering physical identification information identifying a communication device to be prioritized;
adding, when no network identification information of a transmission source included in a data packet received at each communication port exists in the identification information table, the network identification information of the transmission source and physical identification information of the transmission source to the identification information table in accordance with the physical identification information registered and attaching a priority corresponding to the physical identification information of the transmission source to the identification information table in accordance with the physical identification information registered; and
updating the identification information table so as to associate the physical identification information of the transmission source with the network identification information when the network identification information of the transmission source exists in the identification information table, no physical identification information of the transmission source exists in the identification information table, and further the priority corresponding to the physical identification information of the transmission source is higher than a priority corresponding to physical identification information associated with the network identification information of the transmission source in the identification information table, so as to specify a receiving end of the received data packet such that the receiving end is limited to one, and
wherein the network identification information is an IP address, and the physical identification information is a MAC address.

10. A non-transitory computer-readable storage medium storing a program for causing a computer to execute a method that updates an identification information table in which network identification information is associated with physical identification information based on network identification information and physical identification information of a communication device as a transmission source included in a data packet, the method comprising:
associating by the computer a priority representing a communication priority of each communication device with physical identification information of the communication device;
determining by the computer whether network identification information of a transmission source and physical identification information of the transmission source included in a data packet received at each communication port exist in the identification information table;
registering physical identification information identifying a communication device to be prioritized;
adding by the computer, when determining no network identification information of the transmission source exists in the identification information table in accordance with the physical identification information registered, the network identification information of the transmission source and the physical identification information of the transmission source to the identification information table in accordance with the physical identification information registered; and
attaching by the computer a priority corresponding to the physical identification information of the transmission source to the identification information table, and
wherein the communication device is arranged outside a housing enclosing a relay device,
the network identification information is an IP address, and
the physical identification information is a MAC address.

11. The non-transitory computer-readable storage medium according to claim 10, wherein said method comprises:
determining by the computer, whether a priority corresponding to the physical identification information of the transmission source is higher than a priority corresponding to physical identification information associated with the network identification information of the transmission source in the identification information table when determining that the network identification information of the transmission source exists in the identification information table and no physical identification information of the transmission source exists in the identification information table; and
updating by the computer, when determining the priority corresponding to the physical identification information of the transmission source is higher than the priority corresponding to the physical identification information associated with the network identification information of the transmission source in the identification information table, the identification information table so as to associate the physical identification information of the transmission source with the network identification information.

12. A relay device for connecting hardware communication devices to a network, the relay device comprising:
a housing for enclosing the relay device;
a plurality of communication ports connected to the communication devices respectively;
an identification information table in which network identification information identifying each communication device on the network is associated with physical identification information physically identifying the communication device; and
a processor configured to execute an operation including:
associating a priority representing a communication priority of each communication device with the physical identification information of the communication device;
determining whether or not network identification information of a transmission source and physical identification information of the transmission source included in a data packet received at each communication port exist in the identification information table;
registering physical identification information identifying a communication device to be prioritized;
adding the network identification information of the transmission source and the physical identification information of the transmission source to the identification information table in accordance with the physical identification information registered when determining no network identification information of the transmission source exists in the identification information table in accordance with the physical identification information registered; and
attaching a priority corresponding to the physical identification information of the transmission source to the identification information table, and
wherein the hardware communication devices are arranged outside the housing,
the network identification information is an IP address, and the physical identification information is a MAC address.

13. A relay device for connecting hardware communication devices to a network, the relay device comprising:
a housing for enclosing the relay device;
a plurality of communication ports connected to the communication devices respectively, the plurality of communication ports communicatively coupled to the relay device;
an identification information table in which network identification information identifying each communication device on the network is associated with physical identification information physically identifying the communication device; and
wherein a priority representing a communication priority of each communication device is associated with the physical identification information of the communication device;
first determining of whether or not network identification information of a transmission source and physical identification information of the transmission source included in a data packet received at each communication port exist in the identification information table is executed;
a registering section which registers physical identification information identifying a communication device to be prioritized;
the network identification information of the transmission source and the physical identification information of the transmission source is added to the identification information table in accordance with the physical identification information registered by the registering section, when the first determining indicates no network identification information of the transmission source exists in the identification information table in accordance with the physical identification information registered by the registering section; and
a priority corresponding to the physical identification information of the transmission source is attached to the identification information table, and
wherein the hardware communication devices are arranged outside the housing, the network identification information is an IP address, and the physical identification information is a MAC address.

* * * * *